(12) United States Patent
Clubb (10) Patent No.: US 7,664,960 B1
(45) Date of Patent: Feb. 16, 2010

(54) PASSWORD ENHANCING DEVICE

(76) Inventor: Kenneth Wayne Clubb, 6145 Stevens Forest Rd., Columbia, MD (US) 21045

( * ) Notice: Subject to any disclaimer, the term of this patent is extended or adjusted under 35 U.S.C. 154(b) by 669 days.

(21) Appl. No.: 11/309,350

(22) Filed: Jul. 29, 2006

Related U.S. Application Data (60) Provisional application No. 60/596,439, filed on Sep. 23, 2005.

(51) Int. Cl.
*H04L 9/32* (2006.01)
*G06F 21/00* (2006.01)
*H04N 7/167* (2006.01)
*G06F 7/04* (2006.01)
*G06F 12/00* (2006.01)
*G06F 12/14* (2006.01)
*G06F 13/00* (2006.01)

(52) U.S. Cl. ............... 713/184; 380/221; 713/168; 713/182; 726/19

(58) Field of Classification Search ............... 713/184, 713/168, 182; 726/19; 380/221
See application file for complete search history.

(56) References Cited

U.S. PATENT DOCUMENTS

| | | | |
|---|---|---|---|
| 6,079,021 A | 6/2000 | Abadi et al. | 726/14 |
| 6,134,661 A | 10/2000 | Topp | 726/18 |
| 6,662,300 B1 | 12/2003 | Peters | 713/182 |
| 6,748,541 B1 | 6/2004 | Margalit et al. | 726/9 |
| 6,763,399 B2 | 7/2004 | Margalit et al. | 710/13 |
| 2003/0126259 A1* | 7/2003 | Yoshida et al. | 709/225 |
| 2003/0177388 A1* | 9/2003 | Botz et al. | 713/201 |
| 2005/0076247 A1* | 4/2005 | Wittkotter | 713/202 |
| 2005/0091509 A1* | 4/2005 | Herberth | 713/182 |
| 2005/0139658 A1 | 6/2005 | Lambert et al. | 235/382.5 |
| 2005/0177754 A1 | 8/2005 | Pezeshk | 726/19 |
| 2006/0112270 A1* | 5/2006 | Erez | 713/168 |
| 2006/0153380 A1* | 7/2006 | Gertner | 380/221 |
| 2006/0248344 A1* | 11/2006 | Yang | 713/183 |

* cited by examiner

*Primary Examiner*—Shin-Hon Chen (57) ABSTRACT

A device strengthens a user password while the password occupies the keyboard input buffer of an authenticating system. The device masquerades to the system as a second keyboard. The device strengthens the user password by sending keyboard scan codes, altering the user password by inserting and deleting characters. The device is small, portable, and self-contained. The device is Operating System neutral, and can be constructed to be used with any system that supports compounding plug-and-play keyboards, such as USB keyboards and Bluetooth keyboards. The device can be embedded into common input devices such as mice to impersonate a second keyboard. Use of the device improves overall system security by enforcing strong system passwords without encouraging users to write down passwords that are difficult to remember.

16 Claims, 11 Drawing Sheets

PASSWORD ENHANCING DEVICE

CROSS-REFERENCE TO RELATED APPLICATIONS

Not applicable

FEDERALLY SPONSORED RESEARCH

Not applicable

SEQUENCE LISTINGS OR PROGRAM

Not applicable

BACKGROUND OF THE INVENTION

1. Field of Invention

The present invention relates to an apparatus and associated methods for strengthening a user-entered password after the password has been entered through a keyboard, but before the password is committed to the host system for authentication.

2. Prior Art

Securing access to precious resources through the use of secret passwords has been a common practice throughout history. In the book "Arabian Nights", Ali Baba uses a magical password to gain access to a great treasure. Modern computer systems continue to rely on the concept of secret passwords to protect sensitive computer and network resources. Newer authentication mechanisms, such as smartcards and biometric identification devices are becoming more commonplace, but password authentication remains the most common mechanism for protecting sensitive computer resources. However, the prevalence of password authentication has become a dilemma for computer users desiring to access computer resources, and for computer administrators needing to protect those resources.

A few of the challenges facing users are:

Remembering multiple passwords used across multiple systems.

Recalling the new password after a password change has been made.

Remembering the current password after a long period of time has passed since the password was last used.

Inventing new passwords that can be easily remembered but cannot be easily guessed.

Collateral damage when a single password is used across multiple systems and that password is discovered—all of the accounts using that common password are now at risk.

Challenges facing system administrators are:

Users creating weak passwords that can be easily remembered but easily broken.

Users writing down strong passwords because such strong passwords cannot be easily remembered.

Users reusing passwords across various systems—for example using a corporate password on a questionable Internet site.

These difficulties with passwords are overcome by smartcard and biometric authentication devices. However, these new technologies have their own inherent problems:

Smartcards without passwords can be lost or stolen, and then used by unauthorized users.

Biometric devices can wrongly authenticate unauthorized users (false positive), and fail to authenticate authorized users (false negative).

Simple biometric devices such as fingerprint scanners can be easily fooled by clever tactics.

Smartcard and biometric readers must be purchased for each point of access, increasing the cost of ownership.

Additional personnel, software and infrastructure beyond the existing system may be needed to support these devices.

Biometric devices will continue to coexist with password based authentication mechanisms, resulting in two methods of authentication, and making the overall system more complicated for users.

Several approaches in the prior art have attempted to mitigate the known problems inherent with using user passwords for authentication.

U.S. Pat. No. 6,079,021 by Abadi et al is a method of authentication. Initially, an original access code is created by combining the user password with a supplement value of random bits. In operation, the Abadi technique then iterates through all possible supplement values in combination with the user password until the computed trial access code matches the original access code. If a match is found then access is granted, otherwise access is denied. As can be seen, this invention is an authentication method. This method may be incorporated into an operating system kernel for the purposes of authentication, but is not applicable to the problems associated with existing computer systems.

U.S. Pat. No. 6,134,661 by Topp is a method of encrypting a password on a computer. A user activates the invention and then enters a password. The Topp invention is placed between the keyboard and the computer, and encrypts the password characters as they pass through the Topp invention. The Topp invention is therefore connected in series with the user keyboard and the computer system. This approach requires a special keyboard with the device embedded in the keyboard to be connected to the host computer, or for the device to be connected between a regular keyboard and the host computer. Such a device would not work in an ad hoc computing environment, such as a public library or pay-as-you-go office facility where it would be forbidden for a user to disconnect the system keyboard to insert the device.

U.S. Pat. No. 6,662,300 by Peters is a method of improving a password on a computer network by obtaining a string from a remote computer, and then combining the string with a user password using an irreversible function, producing a complete password. However, this approach only works in a network environment and cannot be used, for example, as a means to access a laptop or standalone desktop computer.

Patent application 2005/0177754 is a system for managing passwords. The system uses encryption on a portable access device. The disadvantage of this system is that the host computer must be modified to run specialized encryption software to act in conjunction with the portable access device. This would not be allowed in the general case where systems cannot be altered, such as public libraries and office environments.

U.S. Pat. No. 6,748,541 by Margalit is a portable device that stores information characterizing a user. The portable device provides this characterizing information to the computer system for such purposes as authentication. The invention connects to any "flexibly connectible computer system" (FCCS), which includes computers with USB support. The host computer always initiates the authentication process because no actuator, such as a button or switch, is physically located anywhere on the Margalit invention. Therefore, to accomplish authentication, software to interact with the Margalit invention must to be preinstalled on each host computer protected by the invention. Under these conditions, the invention could not be used on computers that do not have the special software preinstalled, such as at public libraries.

U.S. Pat. No. 6,763,399 by Margalit is similar to '541 by Margalit. In '399 a portable device has encryption capability and stores user-specific information. Similar to the '541 invention, this invention does not have a button or switch physically located on the device to initiate authentication. This device is basically a smartcard with a USB connector. For authentication, this invention requires special software to be installed on each host computer as does the '541 invention, and therefore could not be used with locked-down host computers.

OBJECTS AND ADVANTAGES

As will be described later, the present invention utilizes a single user password known only to the user, and one or more system passwords which are presented to the authenticating systems. Accordingly, several objects and advantages of the present invention are:

(1) Only a single user password is required by the present invention, encouraging the user to select a strong password in exchange for a single password to remember.
(2) The present invention presents a very strong system password, unique for each of the protected systems.
(3) The user password can be reused across multiple systems without the risk of compromising all such systems if one of the system passwords is somehow discovered.
(4) If the present invention is lost or stolen, the system passwords are not compromised, even if the device is physically breached. No encryption technology is necessary in the present invention to protect the system passwords because these passwords are not stored on the device.
(5) If the present invention is lost or stolen, the device cannot be used to gain access to protected systems without the user password.
(6) If the present invention is lost or stolen, the user password cannot be systematically discovered without the utilization of a protected system—the intruder must attempt to authenticate with a protected system to guess the user password.
(7) The present invention has a very low cost of ownership because existing password-based infrastructures are utilized, and no additional readers need to be purchased.
(8) The present invention can be safely reused across both home and corporate systems.
(9) The present invention is easily designed and manufactured from stock components.
(10) The present invention can be integrated into common devices such as keyboards, portable storage devices, and KVM switches, increasing the usefulness of these devices.
(11) The present invention works with virtually all operating systems. This includes Windows, UNIX, and MacOS operating systems.
(12) The present invention can be easily carried on a keychain or a neck chain.

The advantage of the present invention over the Abadi invention is that the present invention does not use trial passwords or one-way hash functions, and does not require special software running on the host computer.

The present invention is an improvement over the Topp invention because the present invention is connected in parallel with the user keyboard instead of in series, and is never aware of the keys pressed by the user. Therefore the present invention does not need to be a separate keyboard or to be connected between the user keyboard and the host computer.

The advantage of the present invention over the Peters invention is that the present computer can be used in a standalone environment such as with a laptop or desktop computer, without connection to a computer network.

The present invention is an improvement over patent application 2005/0177754 because that the present invention does not need to use encryption and does not require specialized software to be installed on the host computer.

The present invention has several advantages over the Margalit inventions. One advantage is that the present invention does not store characterizing information about the user. The final system password is transformed from the user password by the present invention within the keyboard input buffer of the host computer, and this final password is never known to the present invention. Furthermore, the Margalit inventions retain sensitive information about the user placed there by some external process. The present invention generates and saves random enhancement codes onboard the device, without the need of external processing, and these codes do not identify the user. Finally, because the Margalit inventions do not feature any onboard pushbutton or switch, authentication must be initiated by the host computer. Therefore, special software to interact with the Margalit invention must be preinstalled on each host computer protected by the invention. This eliminates the vast majority of all computers on the market. In contrast, the present invention works seamlessly with the vast majority of all computers on the market today without any changes to preinstalled software.

SUMMARY OF THE INVENTION

A device is described which strengthens a user password while the password occupies the keyboard input buffer of an authenticating system. The device masquerades to the system as a second keyboard. The device strengthens the user password by sending keyboard scan codes, altering the user password by inserting and deleting characters.

DETAILED DESCRIPTION

Figure 1:
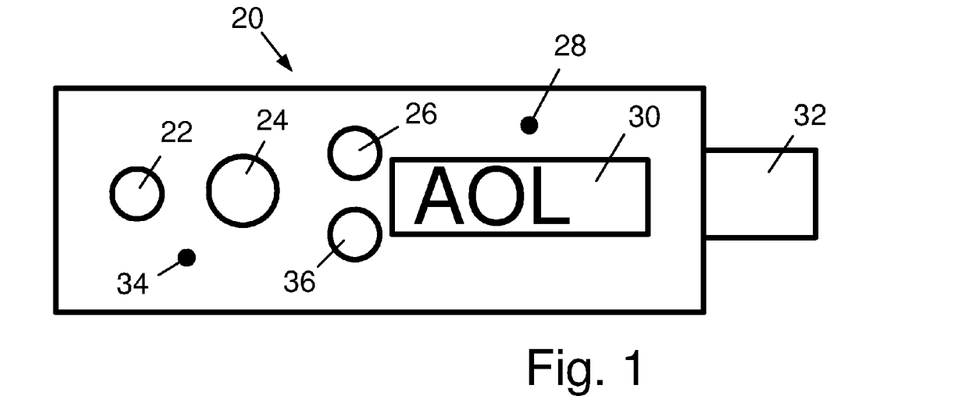
FIG. 1 shows the present invention viewed from above.

FIG. 1, 2, 7, 8, 9—Preferred Embodiment

Figure 2:
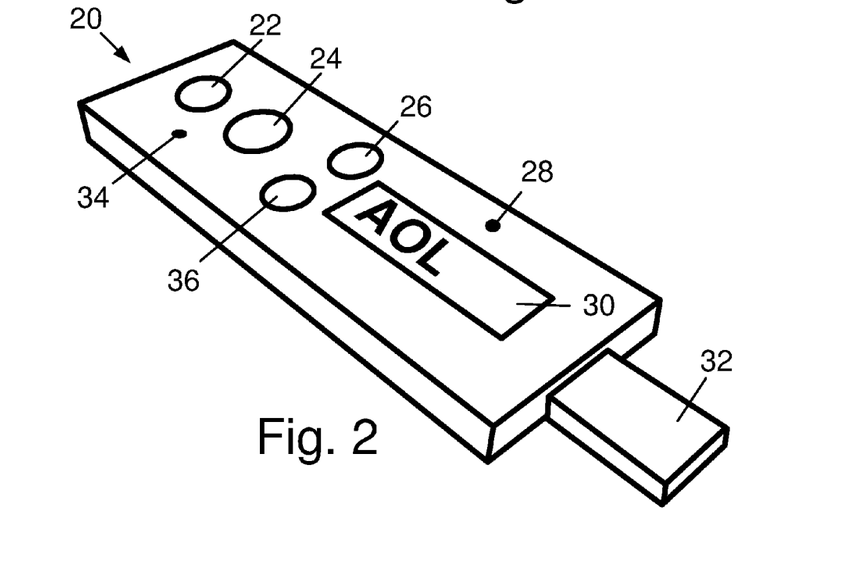
FIG. 2 shows a perspective view of the present invention viewed from the USB connector end.

A preferred embodiment of the present invention is illustrated in FIG. 1 and FIG. 2. The present invention comprising a password enhancer 20 is physically fashioned as a portable USB device. A "USB A" connector 32 extends from one end of the device and can be inserted directly into a computer USB port or into a spare USB connector on a USB keyboard. A USB extension cable can also be used to connect the device to a less accessible host computer. Several pushbuttons appear on the top surface of the device. An Enhance Password button 24 is the most prominent, and is used to initiate the password enhancement function of the device. Before addressing the remaining features in FIG. 1 and FIG. 2, we discuss the Enhancement Code.

Definition of Enhancement Code

Within the present invention, an enhancement code is a sequence of characters to strengthen a password. An enhancement code is sent to the host computer to modify the user password as it exists in the keyboard input buffer. The special ASCII characters "<", ">", "{", "}", and "/" are used respectively as placeholders indicating the left arrow, right arrow, home, end, and delete keys on a computer keyboard. The device translates each of these characters to the appropriate keyboard scan codes before sending the scan codes to the host computer. Other characters in an enhancement code are interpreted literally, and converted to the corresponding keyboard scan codes before sending the scan codes to the host computer.

Figure 7:
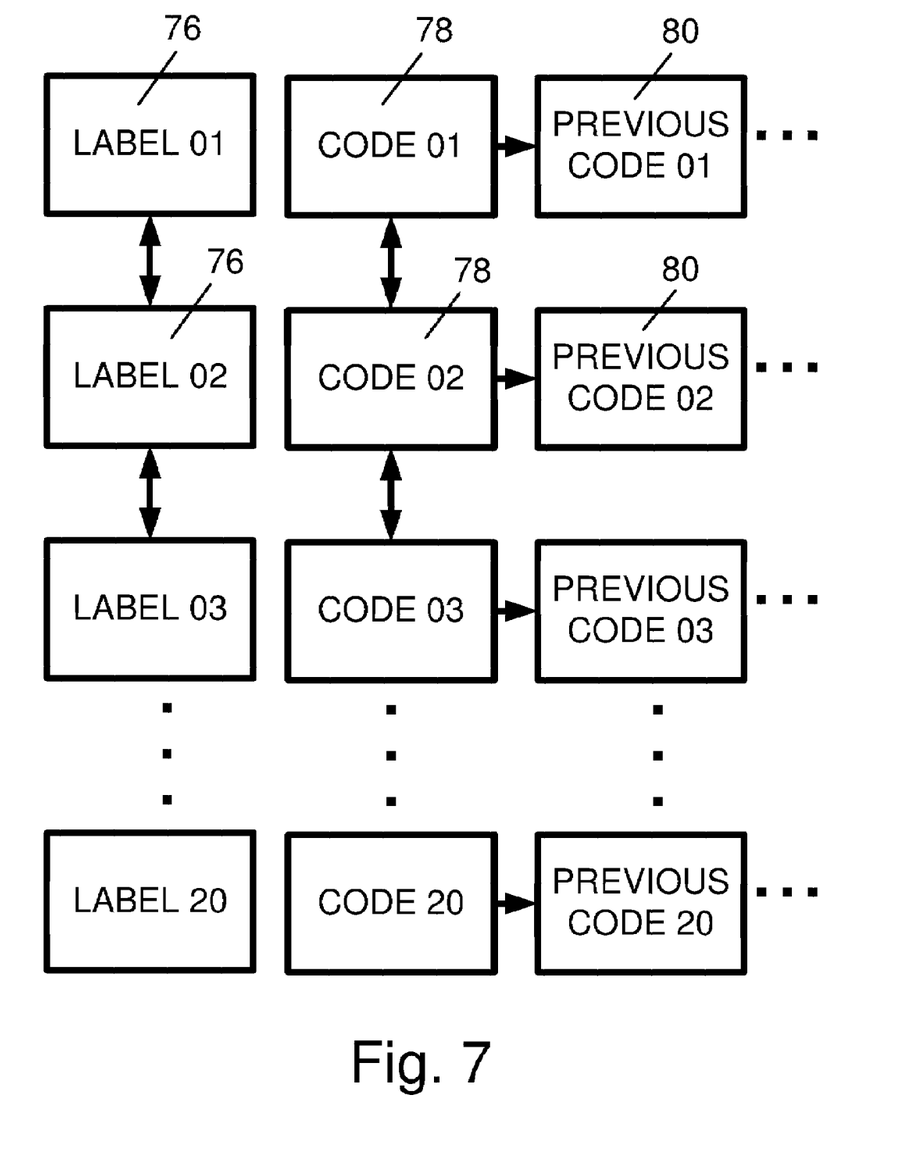
FIG. 7 shows a high level block diagram of the memory layout for enhancement code records within the present invention.

The present invention contains enhancement code records as illustrated in FIG. 7. Each record has an associated label 76 and a current field 78 containing the most recently generated enhancement code. A previous enhancement code field 80 contains the previous enhancement code for the record, and further historical code fields can follow to the right in FIG. 7. Only one field within one record can be selected at a time by the user.

Returning to FIG. 1 and FIG. 2, a Scroll Up button 26 and a Scroll Down button 36 scrolls the selected record up and down one record at a time. A History button 22 scrolls the selected field backwards one field at a time for the selected record. A Generate Enhancement Code button 34 generates a new code for the current enhancement code field, reference 78 in FIG. 7, while shifting the current code into the previous enhancement code field, reference 80 in FIG. 7, further shifting the contents of each remaining field in the record backwards one field. The oldest code is discarded if a memory slot is unavailable. Finally, a Connect button 28 initiates a connection with a management computer.

Figure 8:
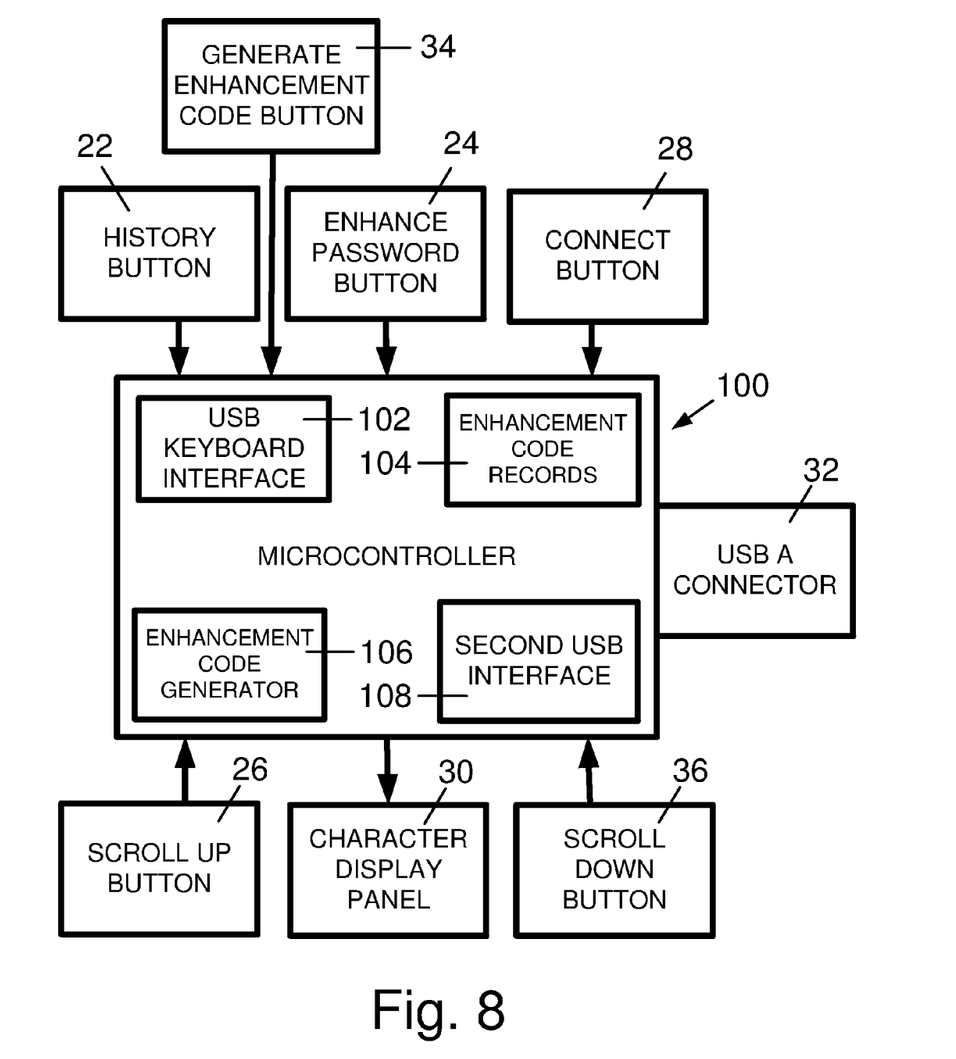
FIG. 8 shows a high level block diagram of the electronic components of the present invention.

FIG. 8 shows a high level block diagram of the present invention. The features on the top surface of the present invention have been previously described in FIG. 1 and FIG. 2, and are repeated here for completeness. The preferred embodiment of the present invention includes an Atmel AT89C5131A-M microcontroller 100, with 32 kilobytes of onboard flash memory. Other USB-specific microcontrollers suitable for this purpose include the Microchip PIC81F4550, and the Cypress Semiconductor USB-EZ family of microcontrollers, among others. The microcontroller contains a USB keyboard interface firmware component 102 which allows the device to impersonate a USB keyboard. The microcontroller also contains enhancement code records 104 in flash memory, previously described in FIG. 7. An enhancement code generator firmware component 106 is programmed into the present invention to generate a new enhancement code when the Generate Enhancement Code button 34 is pressed. Finally, a second USB interface firmware component 108 is programmed into the microcontroller. This USB interface only becomes active when the Connect button 28 is pressed, and allows a management computer, described below, to communicate with the device.

In the preferred embodiment, the second USB interface impersonates a USB flash drive with a single configuration file, providing a simple way to backup, restore, and manage the device settings. The necessary firmware to impersonate a USB keyboard and a USB flash drive is provided by Atmel as source code written in the ANSI C computer language.

Figure 9:
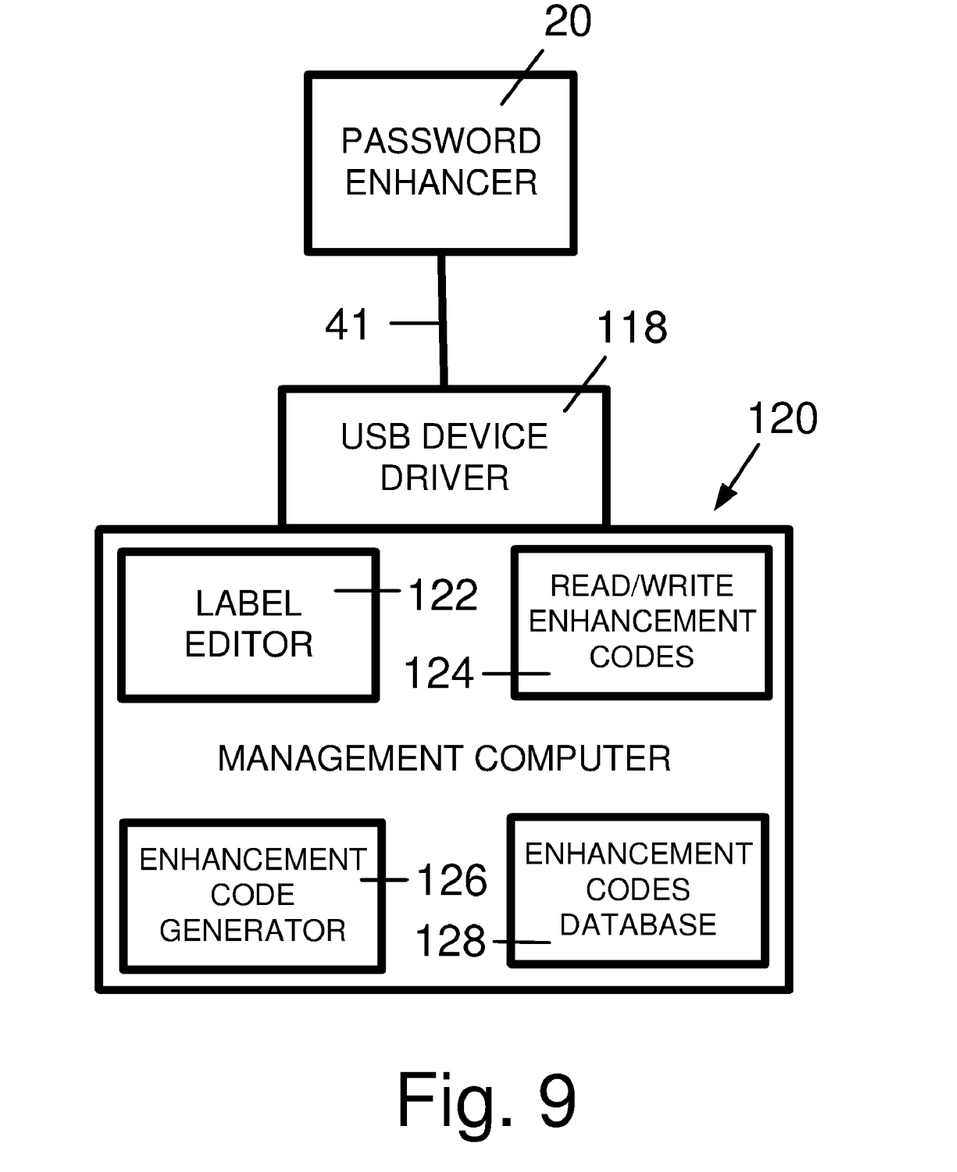
FIG. 9 shows a block diagram of the present invention connected to a management computer.

FIG. 9 shows a block diagram of the password enhancer 20 connected to a management computer 120 using a USB cable 41. A USB driver 118 on the management computer provides support for the USB connection. Because the present invention impersonates a USB flash drive when in Connect button is pressed, the management software only needs to read and write to the device as if it were a binary file. This allows the management program to be implemented for any operating system that supports a USB flash drive without the need for special USB device drivers.

The management computer hosts an interactive label editor 122 that the user uses to define the labels displayed on the device. Also on the management computer is an enhancement code generator 126 that can be used as an alternative to generating the enhancement codes directly on the device. The management computer also hosts a read/write enhancement codes module 124 that provides a way of backing up, restoring, clearing, and cloning the enhancement codes on the device. The Enhancement Codes Database 128 provides storage for the enhancement codes.

Operation—FIG. 3, 4, 5, 6

Whenever two or more USB keyboards are simultaneously connected to the same system, all such keyboards are active and functional at the same time. This characteristic also exists for wireless USB keyboards, Bluetooth keyboards, and will likely be a characteristic shared by most keyboards in the future. Additionally, modern operating systems now allow quick and simple connection of these keyboards because device support is preinstalled as generic device drivers. For the purposes of this specification, we shall call the class of keyboards with these two characteristics compounding plug-and-play (CPAP) keyboards. These two features of CPAP keyboards are central concepts to the present invention.

USB keyboards, for example, are members of a special class of USB devices called HID devices. A HID device is automatically supported immediately when the device is plugged into the host computer—the HID device driver is preinstalled and understands HID devices without any additional software. USB HID keyboards are therefore CPAP devices.

The present invention shares the keyboard input buffer of the host computer with all other keyboards, and can manipulate that buffer in the same way as a real keyboard. For example the device can send a set of keys to move the cursor left 4 spaces, insert a T character, and then delete the following character. This technique is used to "strengthen" a user password as entered by the user, with additional characters such as numeric characters, mixed upper and lower characters, and special characters such as "@" and "$". Furthermore, this feature is true across all operating systems that support CPAP keyboards. This means that the present invention can be used with virtually all modern computer systems by just connecting the device to the computer as if it were a keyboard.

Figure 3:
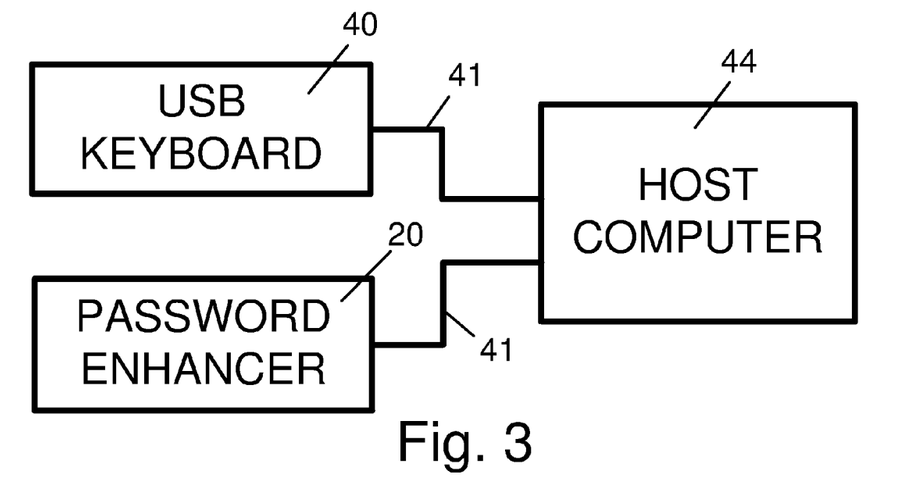
FIG. 3 shows a block diagram of the present invention and a USB keyboard, both connected to a host computer system.
Figure 4:
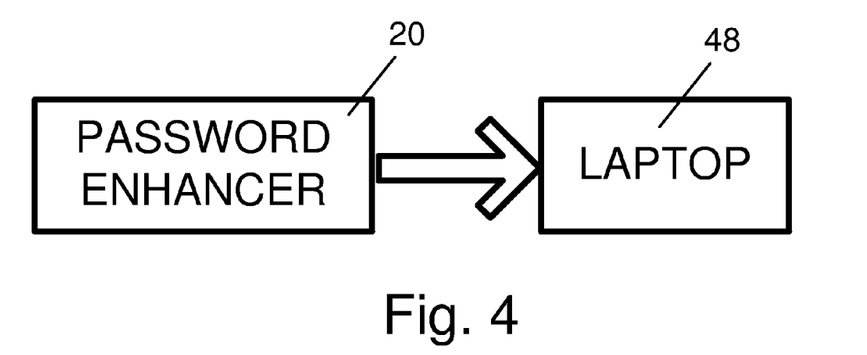
FIG. 4 depicts the present invention connected to a laptop computer.

FIG. 3 and FIG. 4 illustrate the present invention connected to authenticating systems. In FIG. 3 a USB keyboard 40 is connected by a USB cable 41 to a host computer 44. The present invention 20 is connected by a second USB cable 41 to the host computer 44. In FIG. 4, the present invention 20 is plugged directly into a laptop computer 48. The laptop keyboard can be considered just another USB keyboard.

Because wired USB keyboards are the most common CPAP keyboards today, this is the preferred embodiment. However, the USB cable 41 could just as easily be any existing mainstream CPAP connecting means, such as wireless USB or Bluetooth.

Figure 5:
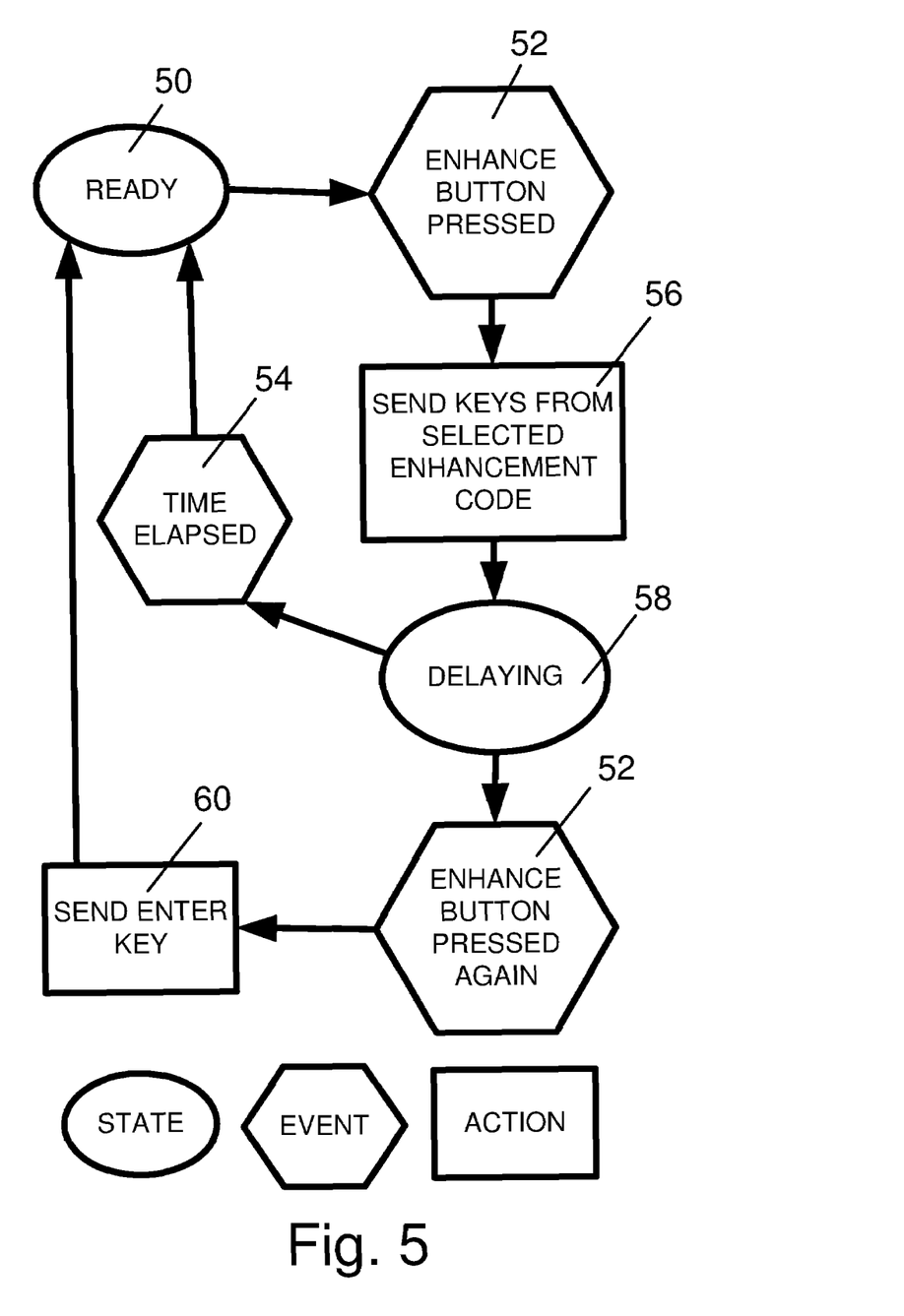
FIG. 5 shows a state diagram of the present invention for processing the Enhance Password button.

FIG. 5 shows a state diagram of the present invention depicting what happens when the Enhance Password button is pressed. Normally, the device is dormant in the Ready state 50. When the Enhance Password button is pressed, event 52, the enhancement code for the selected record and selected field is read, converted into a keyboard scan code sequence, and finally sent through the keyboard interface, action 56. This modifies the input buffer on the authenticating system, enhancing the password. The device then enters the delaying state 58. If the user takes no action and the time elapses, event 54, the device reenters the Ready state. However, if the user presses the Enhance Password button a second time before the delaying state times out, event 52, the device sends a final "Enter" key, action 60, and finally reenters the Ready state. Alternatively, a slightly modified sequence of events from those shown in FIG. 5 is possible, where the delaying state 58 precedes state 56, allowing for another enhance button to be pressed before event 54. This makes additional enhancement codes available to the user.

Figure 6:
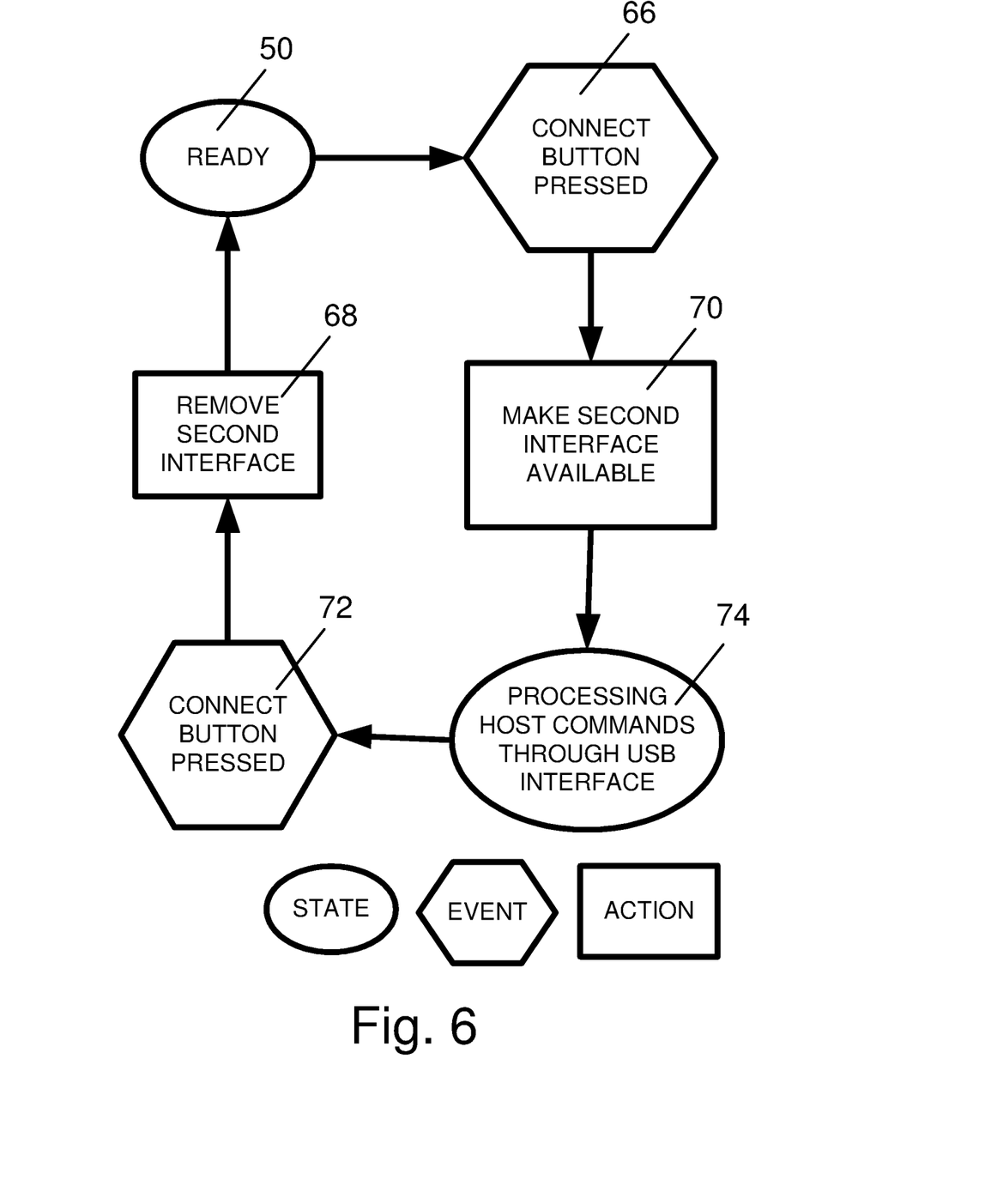
FIG. 6 shows a state diagram of the present invention for processing the Connect button.

FIG. 6 shows a state diagram of the present invention depicting what happens when the Connect button is pressed while the device is connected to a management computer. Normally the device is in the Ready state 50. When the Connect button is pressed, event 66, the device creates a second interface on the connection bus, action 70. This can be done, for example, by using a "soft" connect feature of many of the USB support chips available today. When this happens, the device looks like another kind of device to the host computer, and the host takes the usual action to look for a device driver to support the new interface. At this point the management computer can be used to manage the device remotely by sending data to the device through the second interface, state 74. When the user finally terminates the management session, event 72, the second interface is removed from the connection bus, action 68, and the device reenters the Ready state.

Alternative Embodiments

Figure 10:
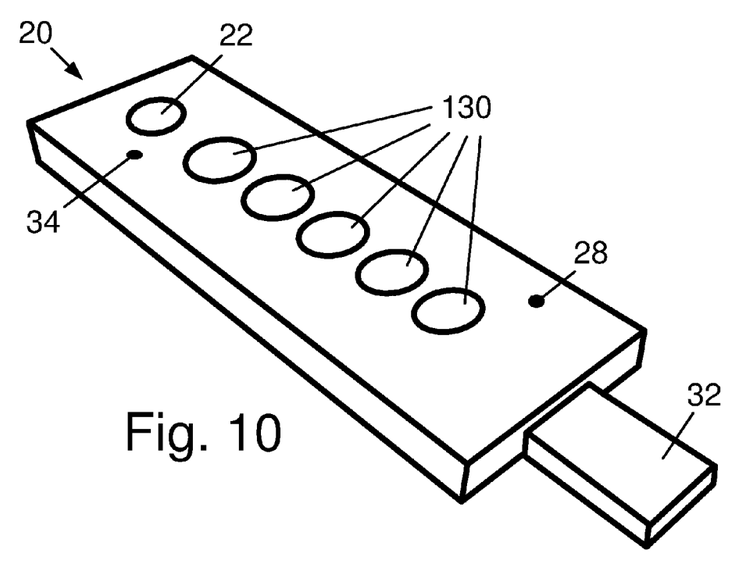
FIG. 10 shows an alternative embodiment of the present invention with five Enhance Password buttons instead of a scrolling display panel.

FIG. 10, 11, 12, 13, 14, 15

FIG. 10 shows an alternative embodiment of the present invention with multiple Enhance Password buttons 130 instead of the more expensive character display panel in the preferred embodiment. Here the device is limited to at most five password enhancements. However, by using more than one user password for a particular password enhancement, the user can extend the usefulness of the device at the expense of remembering more user passwords.

The usage patterns of the Enhance Password buttons can also differ. For example, the first button can be assigned to the home PC, and the second can be assigned to the office PC, sharing the same user password. The third button can be assigned to all online accounts, with a different user password for each account. The fourth and fifth buttons can be assigned to banking and credit card accounts. Splitting out the usages ensures that a compromised online password, for example, will not compromise the home, office, or banking accounts in any way.

Figure 11:
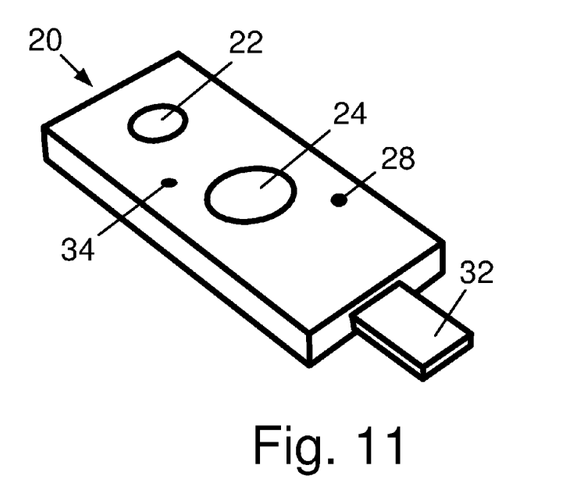
FIG. 11 shows a second alternative embodiment of the present invention with a single Enhance Password button.

FIG. 11 shows a second alternative embodiment similar to the first alternative embodiment, but with only a single Enhance Password button 24. This embodiment may be attractive to organizations that want the use the present invention at the corporate level, but want to discourage the use of the device for systems other than corporate systems.

Figure 12:
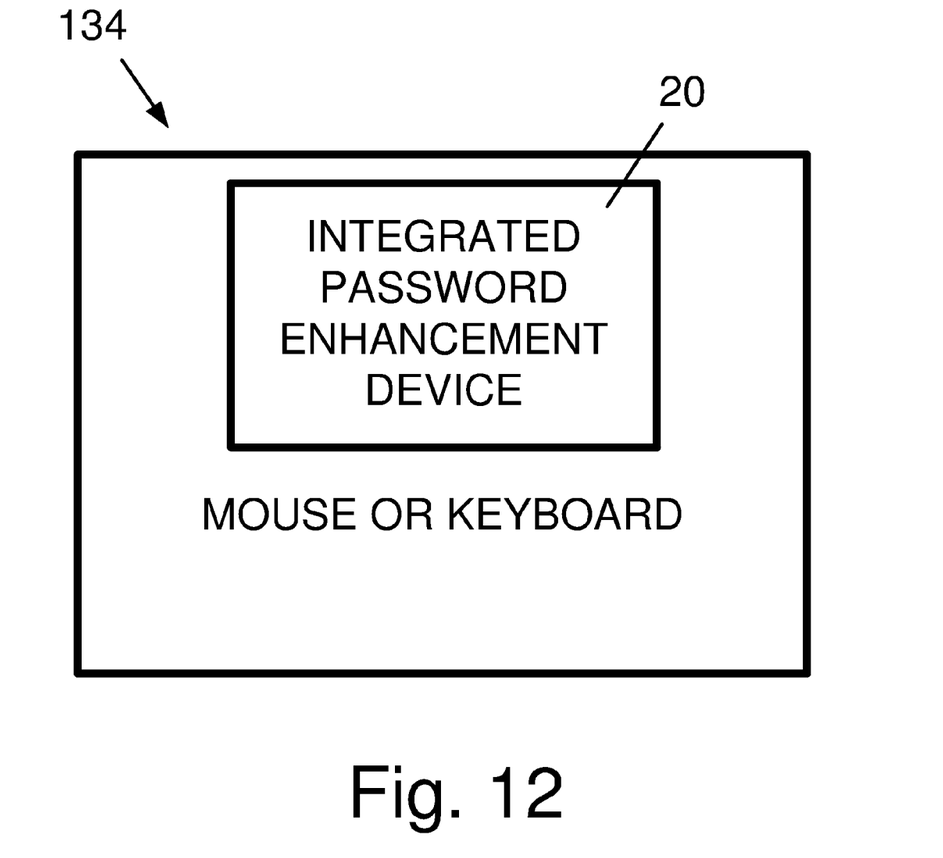
FIG. 12 shows a block diagram of a third alternative embodiment of the present invention. The device is integrated into a mouse or keyboard.

FIG. 12 shows a block diagram of a third alternative embodiment, where the password enhancer 20 is integrated into a keyboard or mouse 134. The keyboard or mouse can incorporate any of the previously described embodiments as features along the side or top surface. The mouse is particularly attractive because it may be easily transported, and integrates well with human usage patterns. Furthermore, the scroll button common on many computer mice today could be utilized to scroll through a list of possible enhancement codes, providing the scrolling feature of the two scroll buttons shown in FIG. 1 and FIG. 2.

Figure 13:
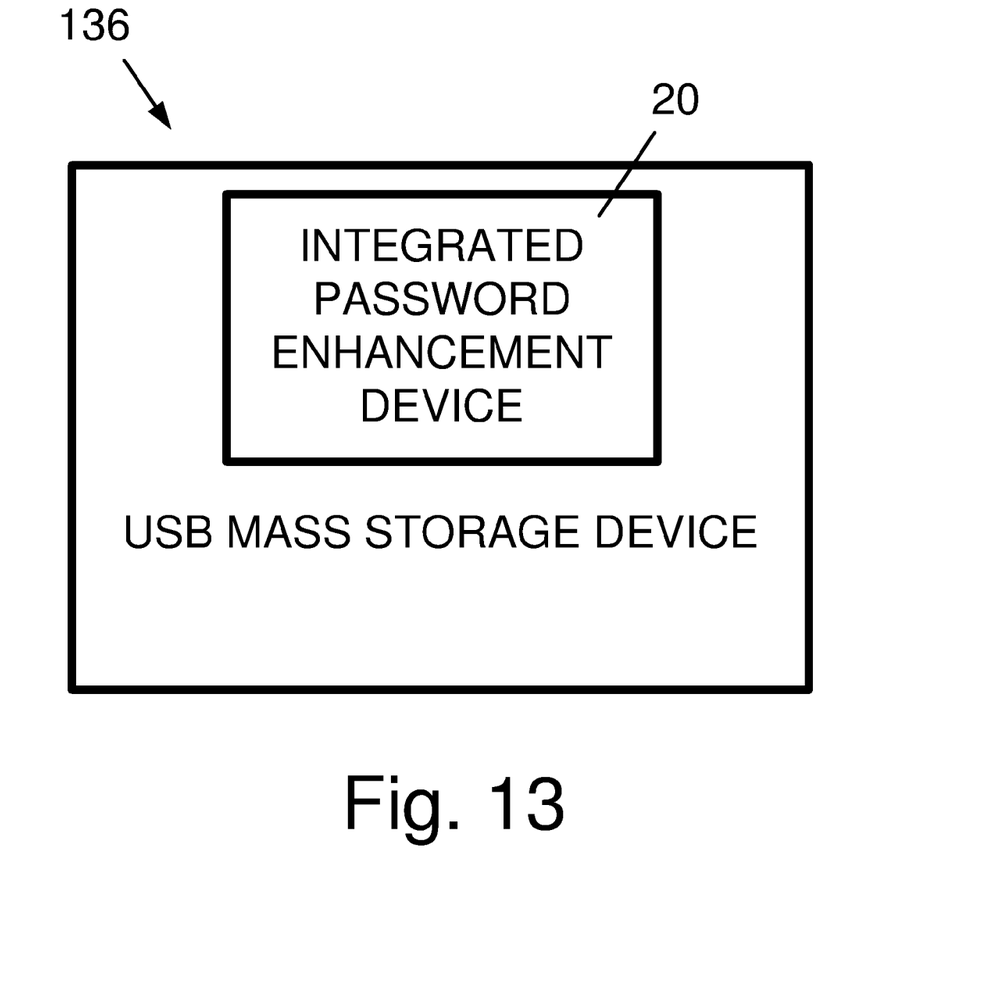
FIG. 13 shows a block diagram of a fourth alternative embodiment of the present invention. The device is integrated into a USB mass storage device.

FIG. 13 shows a block diagram of a fourth alternative embodiment, where the password enhancer 20 is integrated into a USB mass storage device 136. The device has the physical profile of the preferred embodiment, but shares the USB bus with a USB mass storage device interface. These USB mass storage devices are very common today, and are becoming pervasive. The combination if USB storage with the password security provided by the preferred embodiment makes this alternative embodiment very attractive. This embodiment may incorporate features of the previously described embodiments.

Figure 14:
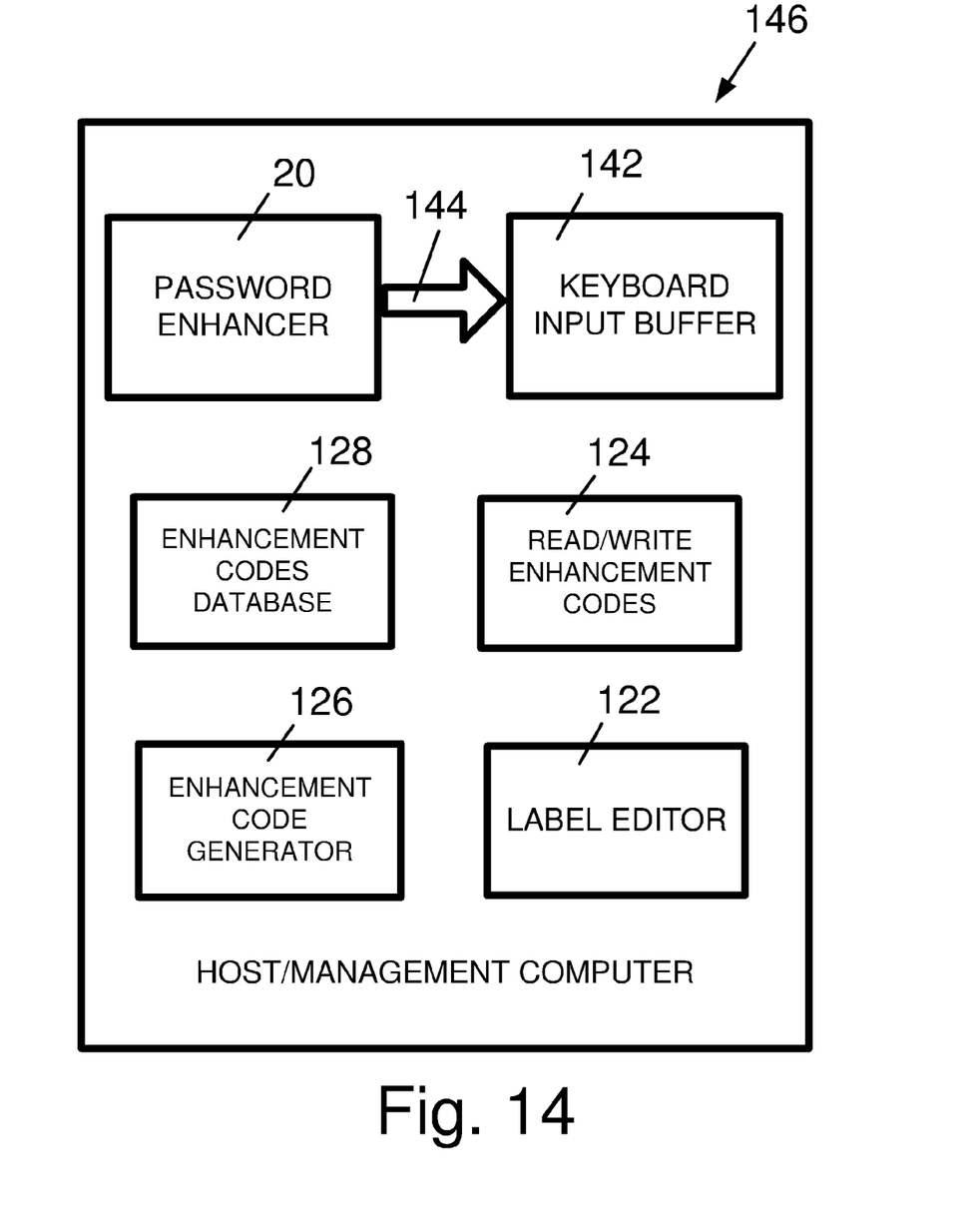
FIG. 14 shows a block diagram of a fifth alternative embodiment of the present invention. The device is integrated into a host computer as a software component.

A fifth alternative embodiment of the present invention is shown in FIG. 14. The password enhancer 20 is embedded and integrated into the host computer 146 as a software component. The means of connecting the component to the keyboard buffer is a window message queue 144, or similar operating system technique. This embodiment combines the management computer and the host computer as a single computer 146. The host/management computer hosts an interactive label editor 122 that the user uses to define the labels to be displayed. Also on the host/management computer is an enhancement code generator 126 that provides for generating enhancement codes. The host/management computer also hosts a read/write enhancement codes module 124 that provides a way of backing up, restoring, clearing, and cloning the enhancement codes. The Enhancement Codes Database 128 provides storage for the enhancement codes.

CONCLUSION, RAMIFICATIONS, AND SCOPE

From the description above, a number of advantages of the present invention become evident. A single user password is memorized by the user and is used for all computer accounts. This eliminates the need for the user to write down the user password. However, a strong password is presented to the authenticating systems, and each system has a unique strong password. This allows for the single user password to be safely used across diverse systems, while simultaneously increasing the security of these diverse sites. Because the system password does not exist locally except in the temporary system keyboard input buffer, encryption is unnecessary to protect the contents of the present invention as long as the user password cannot be easily guessed. Without the actual device, discovering the single user password involves discovering one of the strong system passwords, a very difficult task.

Because the device is functionally similar to common devices, such as USB keyboards, Bluetooth keyboards, and USB flash drives, the device is simple to design and manufacture by engineers already familiar with these existing technologies. Embedding and integrating the present invention into CPAP devices, such as USB mice and USB flash drives is well understood by engineers for the same reason.

Because no additional system hardware or software needs to be purchased to begin using the present invention, there is almost no cost impact on existing organizations. Because the system works with all modern operating systems, there are no decisions to be made regarding the applicability of the device across heterogeneous architectures. Therefore the device can be immediately used in public settings, such as public libraries and pay-as-you-go office facilities.

Finally, because the device can be easily integrated into existing designs, such as USB mass storage devices, mice, keyboards, and all future CPAP devices, the scope of the present invention is very broad and far-reaching, and should be applicable for many years to come.

While the above description contains much specificity, this should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

What is claimed is:

1. A password enhancing system, comprising:
   (1) a password enhancing device, comprising:
      (a) a digital controller capable of executing machine instructions,
      (b) a persistent rewritable memory accessible by said digital controller,
      (c) a host computer connecting means, providing for said password enhancing device to connect to a host computer,
      (d) a keyboard interface implementation means, providing for said password enhancing device to appear as a keyboard using said host computer connecting means,
      (e) a plurality of enhancement code records, stored within said persistent rewritable memory, wherein each enhancement code record is organized as a plurality of historical fields, wherein each said historical field contains a predefined enhancement code,
      (f) a password enhancement invoking means, causing said digital controller to read a particular predefined enhancement code from said plurality of enhancement code records, and then sending said particular predefined enhancement code to said host computer through said host computer connecting means using said keyboard interface implementation means,
   (2) an enhancement code generating means for creating a most-recent instance of said historical field within a given said enhancement code record, whereby said password enhancing system strengthens a user password as it occupies a system keyboard input buffer on said host computer whenever said password enhancement invoking means is used.

2. The password enhancing system of claim 1, wherein said host computer connecting means is a cable.

3. The password enhancing system of claim 1, wherein said host computer connecting means is a wireless connection.

4. The password enhancing system of claim 1, wherein said keyboard interface implementation means is a USB keyboard interface.

5. The password enhancing system of claim 1, wherein said keyboard interface implementation means is a Bluetooth keyboard interface.

6. The password enhancing system of claim 1, wherein said enhancement code generating means is provided by a means within said digital controller.

7. The password enhancing system of claim 1, wherein said enhancement code generating means is provided by a remote management computer, and further including a means for transferring said most-recent instance of said historical field to said password enhancing device.

8. The password enhancing system of claim 1, further including a record selecting means for choosing a selected record from said plurality of enhancement code records.

9. The password enhancing system of claim 8, wherein said record selecting means includes a character display panel for indicating said selected record and a record scrolling means for selecting a particular record as said selected record from within said plurality of enhancement code records.

10. The password enhancing system of claim 9, further including a means for displaying a text label for said selected record.

11. The password enhancing system of claim 8, wherein said record selecting means is a plurality of selection buttons.

12. The password enhancing system of claim 1, further including a management computer managing means for backing up, restoring, and editing said plurality of enhancement code records, and further including a management computer transferring means to transfer said plurality of enhancement code records between said management computer managing means and said password enhancing device.

13. The password enhancing system of claim 1 wherein said password enhancing system is embedded and integrated into a USB mouse.

14. The password enhancing system of claim 1 wherein said password enhancing system is embedded and integrated into a USB keyboard.

15. The password enhancing system of claim 1, wherein said password enhancing system is embedded and integrated into a USB mass storage device.

16. The password enhancing system of claim 1, further including a history selecting means for selecting a particular historical field within said plurality of historical fields.

* * * * *